United States Patent [19]

Fuller

[11] Patent Number: 4,945,644

[45] **Date of Patent: * Aug. 7, 1990**

[54] HEMISPHERICAL SUNDIAL WITH INSTALLATION INDICIA

[76] Inventor: George L. Fuller, 444 E. Park Dr., Spartanburg, S.C. 29302

[ * ] Notice: The portion of the term of this patent subsequent to Jun. 6, 2006 has been disclaimed.

[21] Appl. No.: 304,564

[22] Filed: Feb. 1, 1989

[51] Int. Cl.[5] .................. G04B 49/04; G01C 17/34

[52] U.S. Cl. .................. 33/270; 33/269

[58] Field of Search .................. 33/268, 269, 270, 271

[56] References Cited

U.S. PATENT DOCUMENTS

| | | | |
|---|---|---|---|
| 752,717 | 2/1904 | Smith | 33/269 |
| 794,787 | 7/1905 | Crehore | 33/270 |
| 1,651,621 | 12/1927 | O'Sullivan | 33/270 |
| 1,674,161 | 6/1928 | Bogory | 33/270 |
| 2,205,357 | 6/1940 | Hagner | 33/269 |
| 2,460,346 | 2/1949 | Hagner | 33/269 |
| 3,303,567 | 2/1967 | Blauks | 33/270 |
| 4,081,911 | 4/1978 | Eldridge | 33/270 |
| 4,384,408 | 5/1983 | Bohlayer | 33/270 |
| 4,520,572 | 6/1985 | Sphilhaus | 33/270 |
| 4,835,875 | 6/1989 | Fuller | 33/270 |

FOREIGN PATENT DOCUMENTS

| | | | |
|---|---|---|---|
| 143276 | 5/1935 | Austria | 33/271 |

*Primary Examiner*—Thomas B. Will

[57] ABSTRACT

A sundial with a concave hemispherical body and top surface generally horizontal has longitude displacement, latitude, sun declination, and time indicia originating at the spherical gnomon located at the spherical center of the hemisphere. Site set up is accomplished by plumbing the gnomon over the site latitude and longitude displacement indicia and then rotating on a horizontal surface until the correct time is indicated by the shadow of the gnomon from the sun. Two six-month sundials or two removably attachable inserts are used for indication of watch time for complete years.

3 Claims, 1 Drawing Sheet

HEMISPHERICAL SUNDIAL WITH INSTALLATION INDICIA

BACKGROUND OF THE INVENTION

1. Field of the Invention

The present invention is an improved hemispherical sundial with improvements relating to versatility and ease of manufacture, installation and use.

2. Description of the Prior Art

Sundials indicating local apparent time have been used for thousands of years. A hemispherical sundial indicating civil or mean time was patented by O'Sullivan in 1927 (No. 1,651,621). O'Sullivan told how his sundial could be installed to correct for the difference between local and zone time, but his invention provided no indicia for installation. Also the O'Sullivan sundial was designed to face the celestial equator, which means only twelve hours of time indication would be possible, thereby causing a significant loss of time indication after sunrise and before snuset in the summertime at higher latitudes.

In 1988 a patent application was filed by the present inventor for a cylindrical sundial having installation indicia.

Also recently several instruments have been patented for sighting the site "solar window" and determining the times the sun's rays will be obstructed at the site.

SUMMAY OF THE INVENTION

The object of the invention is to provide an ornamental, universal, hemispherical sundial which provides great accuracy, a full range of time indication, can be mass produced, and can be easily set up by the average person at any site.

The present invention has time indicia and installation indicia making the sundial adaptable for site latitude and longitude, and requires only a plumb line and second time piece to set up. Once set up at the site and secured no further adjustment, calculation, or manipulation is required.

When constructed with a transparent hemisphere the present invention may be reverse sighted to determine the times the sun's rays will be obstructed at the site.

DESCRIPTION OF THE PREFERRED EMBODIMENT

Figure 1:
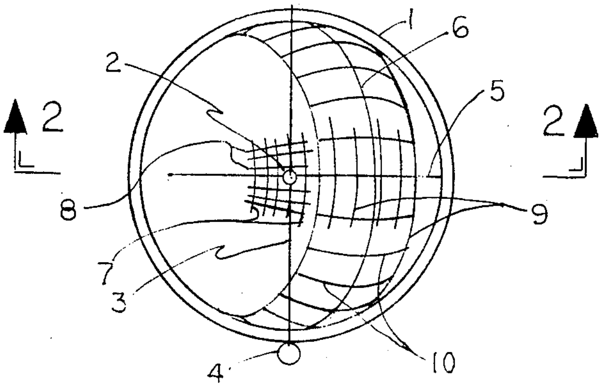
FIG. 1 is a top view of the preferred embodiment of the present invention.
Figure 3:
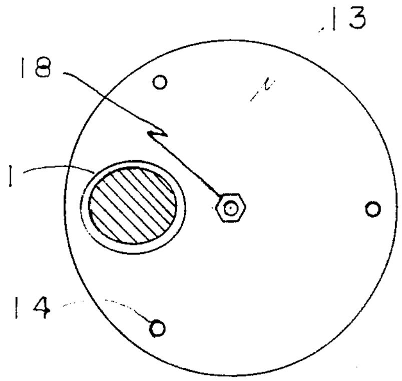
FIG. 3 is a view taken along the line 3—3 of FIG. 2.
Figure 2:
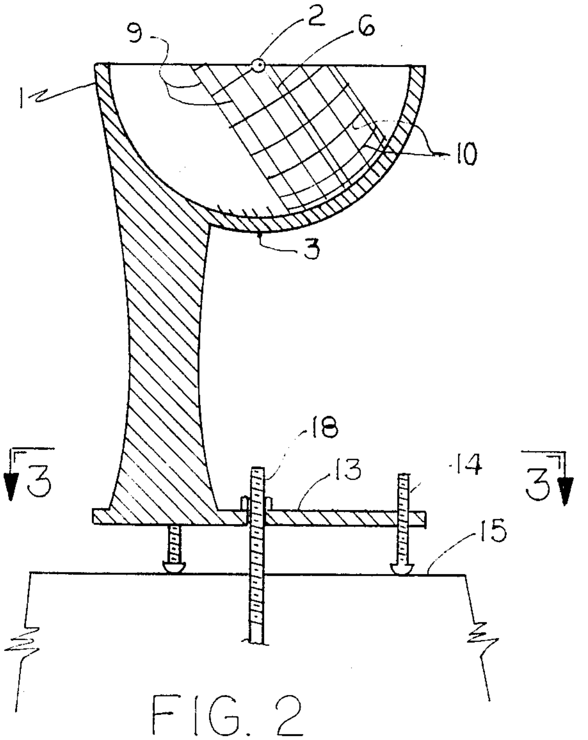
FIG. 2 is a sectional view taken along the line 2—2 of FIG. 1.

The present invention provides a sundial consisting essentially of a body 1 with a hemispherical inner surface of radius $r_1$, and a small spherical gnomon 2. Gnomon 2 has diameter $d_2$ equal approximately to $r_1/25$ and is fixed to cord or wire or line 3. Cord or wire or line 3 passes through the center of gnomon 2 and holds gnomon 2 at the spherical center of hemisphere 1. Spring 4 maintains sufficient tension in cord or wire or line 3 to keep gnomon 2 in place and still allow adjustment if needed.

Reference character 5 is a longitude index line in the form of a portion of a great circle on the inside surface of hemisphere 1 in a plane bisecting hemisphere 1. Reference character 6 is a latitude index line in the form of a portion of a great circle on the inside surface of hemisphere 1 in a plane at right angles to the plane of longitude index line 5 and inclined to the plane end of hemisphere 1 at an angle $\Delta$. The valve of $\Delta$ is not critical but ideally should equal the co-latitude of the proposed site. For extreme northern and southern sites in the contiguous United States a $\Delta$ equal to 55° causes no loss of time indication for six months and only up to approximately one hour of loss at the beginning and end of day at one of the solstices.

When latitude index line 6 is in a plane parallel to the plane of the earth's equator and the celestial equator at the same time a vertical line from gnomon 2 intersects longitude index line 5, longitude index line 5 and gnomon 2 will be in the same plane as the site meridian, and the angular distance on the inside surface of hemisphere 1 between said vertical line and the plane of latitude index line 6, measured along longitude index line 5, will equal the latitude of the site.

Latitude indicia lines 7 are located an angular distance from latitude index line 6, measured along a great circle, of $\pi r_1/180° \times$ degrees of latitude. Longitude displacement indicia lines 8 are portions of great circles located an angular distance from longitude index line 5, measured along latitude index line 6, of $\pi r_1/180° \times$ degrees of site longitude displacement. Site longitude displacement for purposes of the sundial is the difference between the longitude of the site meridian and the longitude of the time zone meridian.

When the sundial is set up at the site with latitude index line 6 and the gnomon in a plane parallel to the celestial equator, and when sun declination equals zero, the shadow of gnomon 2 from the sun will be on latitude index line 6. During the year as the declination of the sun varies between solstices from about 23.44° north about June 21 to about 23.44° south about Dec. 21, the shadow of the gnomon from the sun will vary in the opposite direction an angular distance from latitude index line 6, measured along a great circle, of $\pi r_1/180° \times$ sun declination. Sun declination lines 9 represent approximate sun declination at the solstices and first of months.

When the sundial is set up at the site with latitude index line 6 and the gnomon in a plane parallel to the celestial equator and with longitude index line 5 and the gnomon in a vertical plane with the site meridian, when it is 12 o'clock noon local apparent time the shadow of the gnomon from the sun will be on longitude index line 5. During the day as the sun moves east to west the shadow of the gnomon moves west to east. Apparent time indicia lines 10 are portions of great circles located at an angular distance from longitude index line 5 measured along latitude index line 6, of $\pi r_1/12 \times$ number of hours and fractions of hours before or after 12 o'clock noon apparent time.

For the sundial to indicate civil zone time two corrections are necessary—first a correction for the difference between apparent time, and civil time, and second a correction for the difference between local time and zone time.

To correct for the difference between apparent time and civil time, the time lines must incorporate the equation of time correction for the particular sun declination. Points on civil time indicia lines are calculated from data in a Solar Ephemeris and are located on the inside surface of hemisphere 1 by angular distances—for sun declination, from latitude index line 6 representing zero sun declination; and for equation of time, from the appropriate apparent time indicium line 10.

To correct for the difference between local time and zone time the plane containing gnomon 2 and longitude index line 5 representing 12 o'clock noon apparent time is inclined to a vertical plane containing a great circle on the inside surface of hemisphere 1 at an angle equal to the site longitude displacement.

As the equation of time and sun declination relationship for dates in the winter/spring half year are not the same as for dates in the summer/fall half year, and as values of sun declination for dates in the winter/spring half year are repeated for dates in the summer/fall half year, two hemispheres 1 are used in the preferred embodiment to indicate civil zone time—one for the winter/spring half year and another for the summer/fall half year. In another embodiment two removably attachable inserts are alternately used with a single hemisphere 1.

To set up the sundial, gnomon 2 is plumbed directly over site latitude indicium line 7 and site longitude displacement indicium line 8. In the preferred embodiment, body 1 has base 13 with threaded openings for three adjusting bolts 14 which bear on the horizontal top surface of stationary support 15. Adjusting bolts 14 are turned as necessary to plumb the gnomon over the site indicia. The sundial is then oriented by rotating on the horizontal top surface of stationary support 15 until the correct time is indicated by the shadow of the gnomon from the sun on hemisphere 1.

The present invention is also an instrument to predetermine the position of the sun at various times. By making hemisphere 1 with a transparent material, the line of sight through gnomon 2, a time indicium line, and a sun declination indicium line 9 will establish the position of the sun for that particular time and sun declination.

Figure 4:
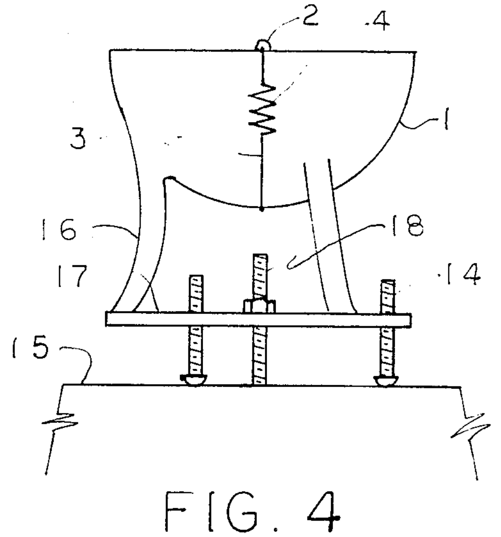
FIG. 4 is a side view of another embodiment of the present invention.

FIG. 4 shows another embodiment wherein body 1 has support legs 16 and support plate 17. Support plate 17 has threaded openings for adjusting bolts 14 and an opening for anchor bolt 18 to secure the sundial in place.

I claim:

1. A hemispherical sundial comprising:

(a) a body having a hemispherical inner surface with a longitude index line on the inner surface in a plane containing the spherical center of said hemisphere and bisecting said hemisphere, and with a latitude index line on the inner surface in a plane containing the spherical center of said hemisphere and at right angles to the plane containing said longitude index line and inclined to the plane end of said hemisphere at an angle within approximately 15° of the co-latitude of a site where said sundial may be used;

(b) a spherical gnomon with means to secure said gnomon at the spherical center of said hemiphere;

(c) longitude displacement indicia lines on the inner surface of said hemisphere with said longitude index line a basis representing zero longitude displacement—such that when a vertical line from the center of said gnomon intersects a longitude displacement indicium line for the site, the plane of said longitude index line will be inclined to the plane of said site longitude displacement indicium line an angular distance, measured along said latitude index line, equal to the difference between the longitude of the site meridian and the longitude of a time zone meridian;

(d) latitude indicia lines on the inner surface of said hemisphere with said latitude index line a basis representing zero latitude—such that when a vertical line from the center of said gnomon intersects the latitude indicium line representing said site latitude, the angular distance from said vertical line to said latitude index line, measured along a great circle will be equal to said site latitude; and (e) time indicia lines on the inner surface of said hemisphere with said latitude index line a basis representing zero sun declination and with said longitude index line a basis representing 12 o'clock noon apparent zone time—such that when said gnomon is vertically above both said site longitude displacement indicium line and said site latitude indicium line, and when said site longitude displacement indicium line is in the plane containing said site meridian, the correct zone time will be indicated by the shadow of the gnomon from the sun.

2. A sundial as set forth in claim 1 further comprising two removably attachable concave inserts—one with longitude index line, latitude index line, and civil time indicia for the winter/spring half year; and the other with longitude index line, latitude index line, and civil time indicia for the summer/fall half year.

3. A sundial as set forth in claim 1 wherein said body is made of a transparent material and includes sun declination indicia lines—such that by sighting upward through said body and aligning said gnomon with one of said declination lines and one of said time indicia lines, the position of the sun for that particular time and sun declination at said site can be estimated.

* * * * *